(12) United States Patent
Shinagawa et al.

(10) Patent No.: US 7,089,907 B2
(45) Date of Patent: Aug. 15, 2006

(54) HYDROGEN-USED INTERNAL COMBUSTION ENGINE

(75) Inventors: Tomohiro Shinagawa, Susono (JP); Takeshi Okumura, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/091,387

(22) Filed: Mar. 29, 2005

(65) Prior Publication Data
US 2005/0224042 A1    Oct. 13, 2005

(30) Foreign Application Priority Data
Apr. 12, 2004 (JP) .............................. 2004-116608

(51) Int. Cl.
F02D 41/04 (2006.01)
(52) U.S. Cl. .......................................... 123/295; 123/3
(58) Field of Classification Search ................ 123/1 A, 123/3, DIG. 12, 295, 431, 304
See application file for complete search history.

(56) References Cited

U.S. PATENT DOCUMENTS 4,147,142 A * 4/1979 Little et al. .................. 123/557
6,655,324 B1 * 12/2003 Cohn et al. .................. 123/1 A
2003/0168024 A1    9/2003 Qian et al.

FOREIGN PATENT DOCUMENTS

| DE | 102 11 122 A1 | 3/2002 |
|---|---|---|
| JP | A 6-159096 | 6/1994 |
| JP | A 7-63128 | 3/1995 |
| JP | A 2000-213444 | 8/2000 |
| JP | A 2002-255503 | 9/2002 |
| JP | A 2003-184667 | 7/2003 |
| JP | A 2003-343360 | 12/2003 |

* cited by examiner

Primary Examiner—Henry C. Yuan
Assistant Examiner—Katrina Harris
(74) Attorney, Agent, or Firm—Oliff & Berridge, PLC (57) ABSTRACT

An internal combustion engine system comprises: a dehydrogenation reactor which performs a dehydrogenation reaction to separate organic hydride-contained fuel into hydrogen and dehydrogenated fuel; supply means which supplies separated hydrogen and dehydrogenated fuel individually to the internal combustion engine; and control means which switches the operation of the internal combustion engine between a first mode in which both hydrogen and dehydrogenated fuel are supplied to the internal combustion engine and a second mode in which only hydrogen is supplied to the internal combustion engine.

10 Claims, 7 Drawing Sheets

HYDROGEN-USED INTERNAL COMBUSTION ENGINE

BACKGROUND OF THE INVENTION

1. Field of the Invention

The present invention relates to a hydrogen-used internal combustion engine.

2. Background Art

As disclosed in, for example, Japanese Patent Laid-open No. 2003-343360, internal combustion engine systems provided with hydrogen generation capability are known in the art. Specifically, such a system comprises a mechanism to generate a hydrogen rich gas and dehydrogenation product such as naphthalene from a hydrogenated fuel containing organic hydrides such as Decalin as well as a hydrogen engine which runs on the generated hydrogen rich gas as fuel.

In the system disclosed in the above-mentioned publication, while a hydrogen engine is operating, hydrogenated fuel is separated into a hydrogen rich gas and dehydrogenation product by utilizing the heat generated by the operation. In more detail, hydrogen is obtained by injecting the hydrogenated fuel onto a catalyst to cause dehydrogenation reaction on the catalyst.

[Patent Document 1] Japanese Patent Laid-open No. 2003-343360

[Patent Document 2] Japanese Patent Laid-open No. 2002-255503

[Patent Document 3] Japanese Patent Laid-open No. 7-63128

In the systems disclosed in the above-cited publications, the dehydrogenation product is collected after stored for a time. Alternatively, however, it may also be possible to construct a system where the dehydrogenation product is supplied as fuel (dehydrogenated fuel) to the engine. In this case, hydrogen and dehydrogenated fuel are supplied to the internal combustion engine at such a ratio as to secure both engine efficiency and emission performance.

On the other hand, hydrogen and dehydrogenated fuel are separated from the hydrogenated fuel at a fixed ratio. If an amount of hydrogen required by the internal combustion engine is separated from the hydrogenated fuel, the amount of dehydrogenated fuel generated together with hydrogen exceeds the amount of dehydrogenated fuel required by the internal combustion engine. Thus, excessive dehydrogenated fuel occurs whenever hydrogen is separated as required.

SUMMARY OF THE INVENTION

The present invention was made in order to solve the above-mentioned problem. It is an object of the present invention to prevent excessive dehydrogenated fuel from being generated in a hydrogen-used internal combustion engine where hydrogenated fuel is separated into hydrogen and dehydrogenation and they are supplied thereto.

According to one aspect of the present invention, a hydrogen-used internal combustion engine comprises dehydrogenating means, supplying means and control means. The dehydrogenating means performs a dehydrogenation reaction to separate an organic hydride-contained fuel into hydrogen and a dehydrogenated fuel. The supplying means supplies the separated hydrogen and dehydrogenated fuel individually to the internal combustion engine. The control means switches the operation of the internal combustion engine between a first mode in which both hydrogen and dehydrogenated fuel are supplied to the internal combustion engine and a second mode in which only the dehydrogenated fuel is supplied to the internal combustion engine. The first mode is a stoichiometric combustion mode and the second mode is a lean burn combustion mode.

According to another aspect of the present invention, a hydrogen-used internal combustion engine comprises dehydrogenating means, supplying means, control means, first storage means and second storage means. The dehydrogenating means performs a dehydrogenation reaction to separate an organic hydride-contained fuel into hydrogen and a dehydrogenated fuel. The supplying means supplies the separated hydrogen and dehydrogenated fuel individually to the internal combustion engine. The control means switches the operation of the internal combustion engine among a first mode in which only hydrogen is supplied to the internal combustion engine, a second mode in which both hydrogen and dehydrogenated fuel is supplied to the internal combustion engine and a third mode in which only the dehydrogenated fuel is supplied to the internal combustion engine. The first storage means stores the separated dehydrogenated fuel. The second storage means stores the separated hydrogen. The control means switches the operation mode of the internal combustion engine among first through third modes based on an operating condition of the internal combustion engine and an amount of the dehydrogenated fuel stored in the first storage means or an amount of hydrogen stored in the second storage means.

Other and further objects, features and advantages of the invention will appear more fully from the following description.

DETAILED DESCRIPTION OF THE PREFERRED EMBODIMENTS

The following will describe an embodiment of the present invention with reference to the drawings. Note that identical elements common to the figures are given the same referenced numeral and redundant descriptions of them are avoided. Also note that the present invention is not limited to the following embodiments.

First Embodiment

Figure 1:
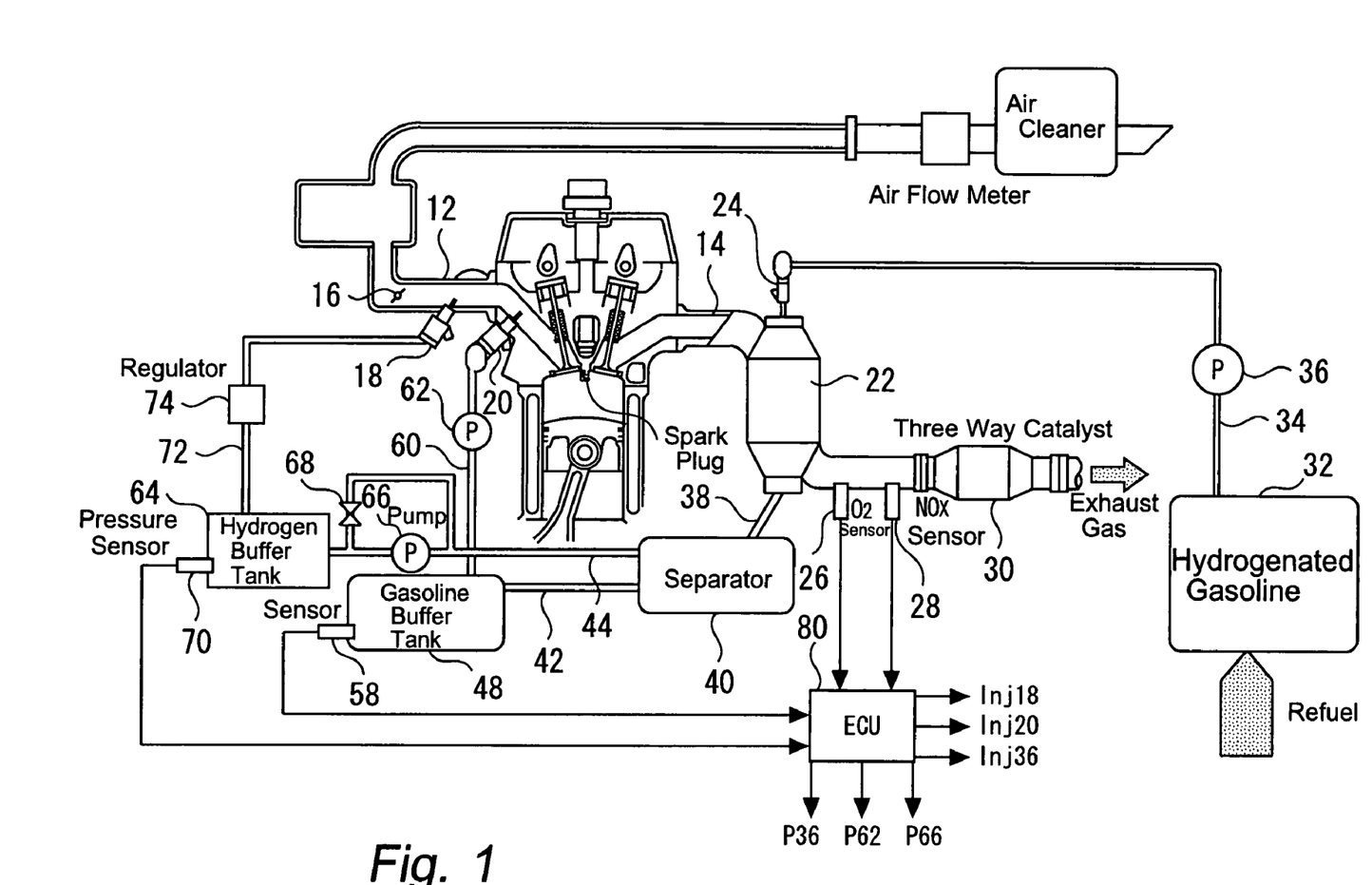
FIG. 1 is provided to explain the configuration of an internal combustion engine system common to the embodiments of the present invention.

FIG. 1 is provided to explain the configuration of an internal combustion engine system common to the embodiments of the present invention. This system has an internal combustion engine 10, to which an intake pipe 12 and an exhaust pipe are connected.

In the intake pipe 12, a throttle valve 16 is installed to control the amount of air to be inhaled. A hydrogen injector 18 is disposed downstream of the throttle vale 16. In addition, a gasoline injector 20 is disposed at the intake port of the internal combustion engine 10.

As described later, hydrogen rich gas is supplied to the hydrogen injector 18 at a certain pressure. Receiving a drive signal from the outside, the hydrogen injector 18 opens the valve to inject hydrogen rich gas into the intake pipe 12. The amount of hydrogen rich gas to be injected is in accordance with the valve opening duration. Although the hydrogen injector 18 is disposed at the intake pipe 12 in the system of FIG. 1, the configuration is not limited to this arrangement. Specifically, the hydrogen injector 18 may be mounted into the main body of the internal combustion engine 10 so that hydrogen can be injected into the cylinder.

Gasoline is supplied to the gasoline injector 20 at a certain pressure as described later. Receiving a drive signal from the outside, the gasoline injector 20 opens its valve to inject gasoline into the intake port. The amount of gasoline to be injected is in accordance with the valve opening duration.

A dehydrogenation reactor 22 is attached to the exhaust pipe 14. In addition, hydrogenated gasoline injector 24 is mounted into the top of the dehydrogenation reactor 22.

As described later, hydrogenated gasoline is supplied to the hydrogenated gasoline injector 24 at a certain pressure. Receiving a drive signal from the outside, the injector 24 opens its valve to inject hydrogenated gasoline into the dehydrogenation reactor 22. The amount of hydrogenated gasoline to be injected is in accordance with the valve opening duration. The amount of hydrogen required by the internal combustion engine 10 changes depending on the running condition of the internal combustion engine 10. In an ECU 80, a map is stored which defines the relationship between the amount of hydrogen required by the internal combustion engine 10 and the running conditions (engine rotation speed and load (throttle opening)). The ECU 80 calculates the required amount of hydrogen from this map and controls the opening/closing of the hydrogenated gasoline injector 24. In addition, by utilizing the heat given by the exhaust pipe 14, the dehydrogenation reactor 22 can separate the thus supplied hydrogenated gasoline into hydrogen rich gas and dehydrogenated gasoline (dehydrogenated fuel) and send them out.

In the exhaust pipe 14, an exhaust temperature sensor 25 is mounted upstream of the dehydrogenation reactor 22. In addition, an $O_2$ sensor 26 and a NOx sensor 28 are mounted into the exhaust pipe 14 downstream of the dehydrogenation reactor 22. Based on the amount of oxygen in the exhaust gas, the $O_2$ sensor 26 provides an output that represents the exhaust air-fuel ratio. In addition, the NOx sensor 28 provides an output that represents the NOx concentration in the exhaust gas. Downstream of these sensors 26 and 28, a catalyst 30 is disposed to purify the exhaust gas.

This system of the embodiment is provided with a hydrogenated gasoline tank 32. The hydrogenated gasoline stored in the hydrogenated gasoline tank 32 contains great amounts of organic hydrides as compared with common gasoline. Here, "organic hydrides" mean hydrocarbon (CH) components that show dehydrogenation at temperatures around 300° C. Specifically, they are Decalin, cyclohexane and the like.

Normal gasoline (LFT-1C) contains some 40% toluene. By hydrogenating toluene, it is possible to produce methylcyclohexane ($C_7H_{14}$), an organic hydride. That is, to use normal gasoline as the raw material, by hydrogenating toluene contained in the normal gasoline, it is possible to produce a hydrogenated gasoline that contains some 40% methylcyclohexane. For convenience, it is assumed that the hydrogenated tank 32 in this embodiment is supplied with a hydrogenated gasoline of such a composition.

A hydrogenated gasoline supply pipe 34 is connected to the hydrogenated gasoline tank 32. The hydrogenated gasoline supply pipe 34 is provided with a pump 36 halfway in its route and connected to the hydrogenated gasoline injector 24 at the end thereof. During operation of the internal combustion engine, hydrogenated gasoline is pumped up from the hydrogenated gasoline tank 32 and supplied to the hydrogenated gasoline injector 24 at a certain pressure.

As mentioned above, the hydrogenated gasoline injector 24 is mounted into the top of the dehydrogenation reactor 22. The dehydrogenation reactor 22 is a device to process hydrogenated gasoline by utilizing the exhaust heat. During operation of the internal combustion engine, the internal temperature of the dehydrogenation reactor 22 exceeds 300° C.

To prevent direct exposure to the internal temperature, the hydrogenated gasoline injector 24 is mounted so that its main portion projects upward from the top of the dehydrogenation reactor 22. Therefore, the temperature of the hydrogenated gasoline injector 24 does not improperly rise in this system of the embodiment.

Note that although the hydrogenated gasoline injector 24 is air-cooled in the system of FIG. 1, the cooling method is not limited to air-cooling. For example, cooling water in the internal combustion engine 10 may be used to cool the hydrogenated gasoline injector 24. In this case, the coolant passage is designed to have a portion that goes around the hydrogenated gasoline injector 24.

The dehydrogenation reactor 22 has a reaction chamber formed therein. Fuel injected from the hydrogenated gasoline injector 24 is separated into hydrogen rich gas and dehydrogenated gas in the reaction chamber and guided into a pipe 38 that is connected to the dehydrogenation reactor 22. The dehydrogenation reactor 22 communicates with a separator 40 via the pipe 38.

As already mentioned, the hydrogenated gasoline used in this embodiment is obtained from a normal gasoline by converting toluene contained in the gasoline to an organic hydride. Thus, dehydrogenating the hydrogenated gasoline produces hydrogen rich gas and normal gasoline (dehydrogenated fuel). Specifically, methylcyclohexane $C_7H_{14}$, an organic hydride, is separated into hydrogen $H_2$ and toluene $C_7H_8$ through the following dehydrogenation reaction:

$$C_7H_{14} \rightarrow C_7H_8 + 3H_2 \qquad (1)$$

Dehydrogenation reaction given by Formula (1) is an endoergic reaction.

Thus, a mixture of hydrogen rich gas and normal gasoline is supplied to the separator 40 from the dehydrogenation reactor 22.

The separator 40 has the capability to separate the hot mixture supplied from the dehydrogenation reactor 22 into hydrogen rich gas and dehydrogenated gasoline (normal gasoline) by cooling the mixture. Similar to the internal combustion engine 10, the separator 40 is cooled by circulating water. This allows the separator 40 to efficiently separate the mixture into hydrogen rich gas and dehydrogenated gasoline.

In the bottom of the separator 40, there is a liquid reservoir space to pool cooled and therefore liquefied dehydrogenated gasoline there. Above this reservoir space, there is a vapor reservoir space to pool hydrogen rich gas still in vapor phase. A gasoline pipe 42 connected into the separator 40 gives communication to the liquid reservoir space. Likewise, a hydrogen pipe 44 gives communication to the vapor reservoir space.

The gasoline pipe 42 is connected into the gasoline buffer tank 48. Note that although in FIG. 1, the hydrogenated gasoline tank 32 is distant from the gasoline buffer tank 48, the configuration is not limited to this layout. For example, they may be accommodated in a single box.

A liquid level sensor 58 is mounted into the gasoline buffer tank 48. The gasoline level sensor 58 provides an output that represents the volume of dehydrogenated gasoline pooled therein. In addition, a gasoline pipe 60 is connected into the gasoline buffer tank 48. The gasoline pipe 60 is provided with a pump 62 halfway in its route and connected to the gasoline injector 20 at the end thereof. During operation of the internal combustion engine, dehydrogenated gasoline is pumped up from the gasoline buffer tank 48 and supplied to the gasoline injector 20 at a certain pressure.

The hydrogen pipe 44 is connected into a hydrogen buffer tank 64. A pump 66 and a relief valve 64 are installed in the hydrogen pipe 44. From the separator 40, hydrogen rich gas is supplied under pressure into the hydrogen buffer tank 64 by the pump 66. The relief valve 68 prevents the delivery pressure of the pump 66 from rising excessively. With the pump 66 and the relief valve 68, hydrogen rich gas can be supplied into the hydrogen buffer tank 64 without causing the internal pressure to rise excessively.

A pressure sensor 70 is mounted into the hydrogen buffer tank 64. The pressure sensor 70 provides an output which represents the internal pressure of the hydrogen buffer tank 64. According to the output of the pressure sensor 70, it is possible to estimate the amount of hydrogen rich gas pooled in the hydrogen buffer tank 64.

A hydrogen supply pipe 72 is connected into the hydrogen buffer tank 64. The hydrogen supply pipe 72 is provided with a regulator 74 halfway in its route and connected to the hydrogen injector 18 at the end thereof. With this configuration, hydrogen rich gas is supplied to the hydrogen injector 18 at a pressure regulated by the regulator 74 unless hydrogen rich gas is not pooled in the hydrogen buffer tank 64.

This system of the embodiment is provided with an ECU (Electronic Control Unit) 80. The ECU 80 functions to control this system of the embodiment. To the ECU 80, the outputs of various sensors including the above-mentioned $O_2$ sensor 26, NOx sensor 28, liquid level sensor 58 and pressure sensor 70 are provided. In addition, actuators including the above-mentioned pumps 36, 62 and 66 and injectors 18, 20 and hydrogenated gasoline injector 24 are connected to the ECU 80. By performing routine processing based on the sensor outputs, the ECU 80 can appropriately drive the various actuators.

Figure 2:
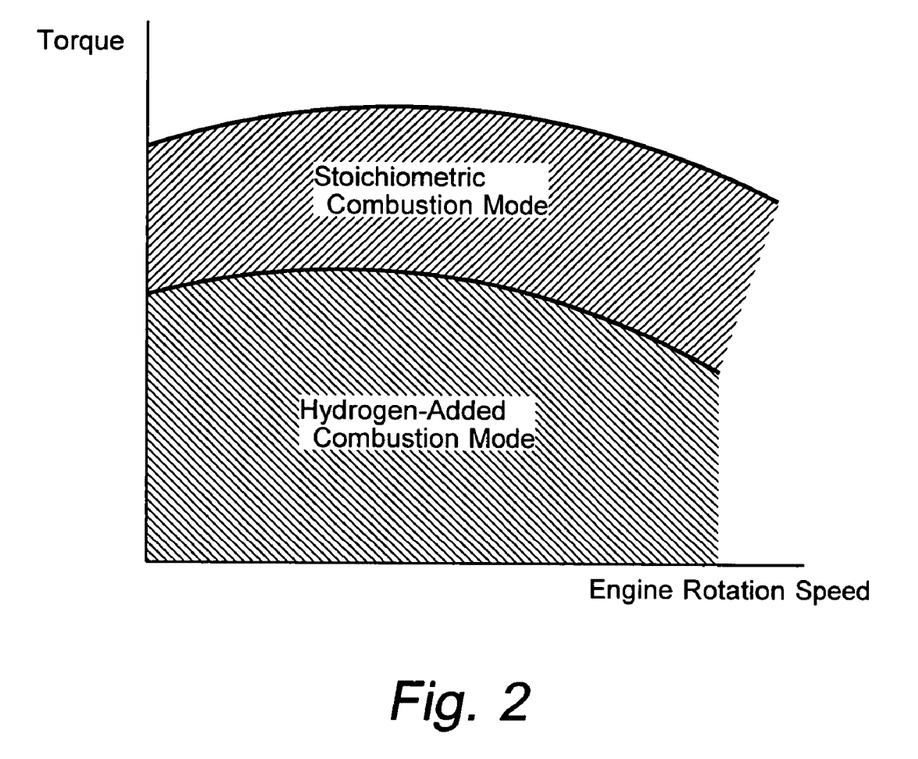
FIG. 2 shows the operation modes of the system of the first embodiment.

Now the following describes the operation modes of the system of the embodiment based on FIG. 2. The system of the embodiment has two types of modes: stoichiometric combustion mode and hydrogen-added combustion mode (lean burn combustion mode). In the stoichiometric combustion mode, only the gasoline (dehydrogenated fuel), obtained by dehydrogenating hydrogenated gasoline, is used to run the internal combustion engine 10. In the hydrogen-added combustion mode, lean combustion is caused by using both gasoline and hydrogen to run the internal combustion engine 10.

As shown in FIG. 2, the hydrogen-added combustion mode is executed in the idling to normal rotation speed regions. The upper limit of the operating condition range covered by the hydrogen-added combustion mode is defined according to the maximum amount of hydrogen which the dehydrogenation reactor 22 can generate. In higher load and higher rotation speed regions beyond the upper limit, the stoichiometric combustion mode is executed. Due to lean burn, operation in the hydrogen-added combustion mode can improve the fuel expenses and engine efficiency. In addition, it can improve the emission since discharged NOx is reduced.

In the hydrogen-added combustion mode, the ratio of added hydrogen to gasoline must be appropriate. However, if the hydrogen and gasoline obtained by dehydrogenation process are simply supplied to the internal combustion engine 10, it is possible that the amount of hydrogen supplied become insufficient relative to the amount of gasoline supplied.

The ratio of the amount of hydrogen supplied to the internal combustion engine 10 to the corresponding amount of gasoline should be determined according to the amounts of heat generated by hydrogen and gasoline, respectively. Preferably, the amount of heat supplied by hydrogen is set to about 20% of the amount of heat supplied by gasoline. The following describes what molar ratio of hydrogen to gasoline realizes this relation.

The amount of heat generated per gram of the gasoline (LFT-1C) which is obtained by dehydrogenating hydrogenated gasoline is 42.42 kJ/g. Provided that the gasoline consists of $C_7H_{12}$, the amount of heat generated per mol is 4072.32 kJ/mol since the mass of $C_7H_{12}$ is 96 g/mol.

On the other hand, the amount of heat generated by hydrogen per gram is 121 kJ/g. Since the mass of hydrogen is 2 g/mol, the amount of heat generated per mol of hydrogen is 242 kJ/mol. Twenty percent of the amount of heat supplied by the gasoline per mol (=4072.32 kJ/mol) is 4072.32× 0.2≈814 kJ. The amount of hydrogen required to supply this amount of heat is 814/242=3.36 moles since the amount of heat generated per mole of hydrogen is 242 kJ/mol.

According to Formula (1), 1 mole of toluene and 3 moles of hydrogen are generated from 1 mole of methylcyclohexane. As mentioned above, since normal gasoline contains some 40% toluene, one mole of hydrogenated gasoline, which is obtained by hydrogenating normal gasoline, contains 0.4 mole of methylcyclohexane. Therefore, as the result of applying dehydrogenating process to one mole of hydrogenated gasoline, 0.4 mole of toluene and 1.2 moles of hydrogen are generated.

Given that the amount of heat supplied by hydrogen is 20% of the amount of heat supplied by gasoline, however, 3.36 moles of hydrogen are required for one mole of gasoline as described above. Therefore, hydrogen falls short by 3.36−1.2=2.16 moles.

To add an appropriate percentage of hydrogen to gasoline, it is necessary to apply dehydrogenation process to a greater amount of hydrogenated gasoline so as to prevent hydrogen from falling short. However, since not only hydrogen but also gasoline are generated by the dehydrogenation process, this generates an excessive amount of gasoline if the required amount of hydrogen is generated by the dehydrogenation process.

In this embodiment, therefore, excessive gasoline generated in the hydrogen-added combustion mode is stored for use in the stoichiometric mode. This makes it possible to prevent excessive gasoline generated in the hydrogen-added combustion mode from accumulating within the system.

Figure 3:
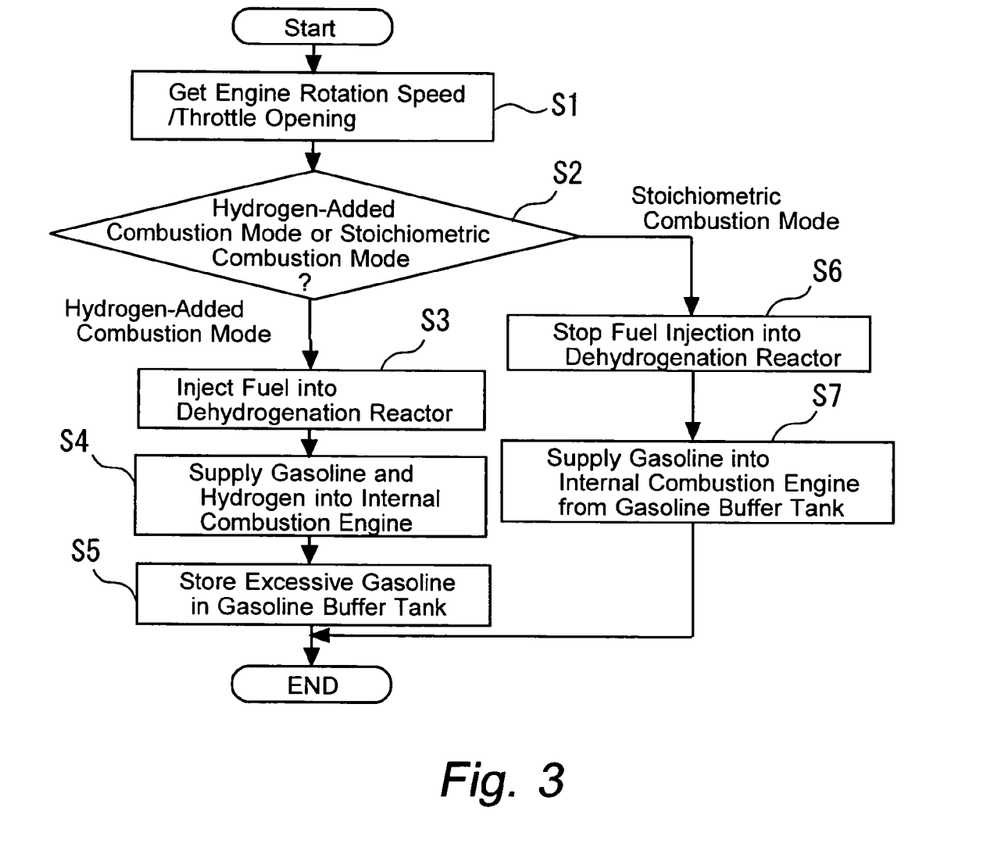
FIG. 3 is a flowchart of processing performed by the hydrogen-used internal combustion engine in the first embodiment.

FIG. 3 is a flowchart of processing performed by the hydrogen-used internal combustion engine in this embodiment. At first, the engine rotation speed and the throttle opening are obtained in step S1. Then, based on the engine rotation speed and throttle opening obtained in step S1, it is judged in step S2 which of the hydrogen-added combustion mode and the stoichiometric combustion mode is appropriate for the current operating condition.

If the hydrogen-added combustion mode is judged appropriate in step S2, processing goes to step S3. In this case, hydrogen must be generated from hydrogenated gasoline in order to supply hydrogen to the internal combustion engine 10. Therefore, hydrogenated gasoline is injected into the dehydrogenation reactor 22 from the hydrogenated gasoline injector 24. In the dehydrogenation reactor 22, hydrogen and gasoline are generated as a result of dehydrogenation reaction.

In the next step S4, certain amounts of hydrogen and gasoline which depend on the operating conditions are supplied to the internal combustion engine 10 from the hydrogen injector 18 and the gasoline injector 20. The amounts of hydrogen and gasoline to be supplied are calculated according to the engine rotation speed and throttle opening obtained in step S1. Alternatively, the amounts of hydrogen and gasoline to be supplied may also be determined from a map that defines the relationships between the amounts of hydrogen and gasoline to be supplied and the engine rotation speed and the throttle opening. The internal combustion engine 10 is thus operated in the hydrogen-added combustion mode.

In the next step S5, excessive gasoline that was generated by dehydrogenation reaction in step S3 but not supplied to the internal combustion engine 10 is stored in the gasoline buffer tank 48. After step S5, processing is terminated.

If the stoichiometric combustion mode is judged appropriate in step S2, processing goes to step S6. In step S6, injection of hydrogenated gasoline into the dehydrogenation reactor 22 is stopped.

In the next step S7, gasoline stored in the gasoline buffer tank 48 is sent to the gasoline injector 20 for injection into the internal combustion engine 10. The internal combustion engine 10 is thus operated in the stoichiometric combustion mode. After step S7, processing is terminated.

In the first embodiment, as described so far, the internal combustion engine 10 is operated in the hydrogen-added combustion mode or the stoichiometric combustion mode depending on the operating conditions and excessive gasoline in the hydrogen-added combustion mode is stored in the gasoline buffer tank 48 for use in the stoichiometric combustion mode. It is therefore possible to prevent excessive gasoline from accumulating within the system. In addition, system efficiency can be raised since dehydrogenation reaction is not necessary in the stoichiometric combustion mode.

Second Embodiment

The following describes a second embodiment of the present invention. The second embodiment is identical to the first embodiment in that excessive gasoline in the hydrogen-added combustion mode will be used in the stoichiometric combustion mode. In the second embodiment, however, hydrogenated gasoline is injected into the dehydrogenation reactor 22 to generate gasoline during operation in the stoichiometric combustion mode if the level of gasoline in the gasoline buffer tank 48 becomes equal to or lower than a certain level.

Figure 4:
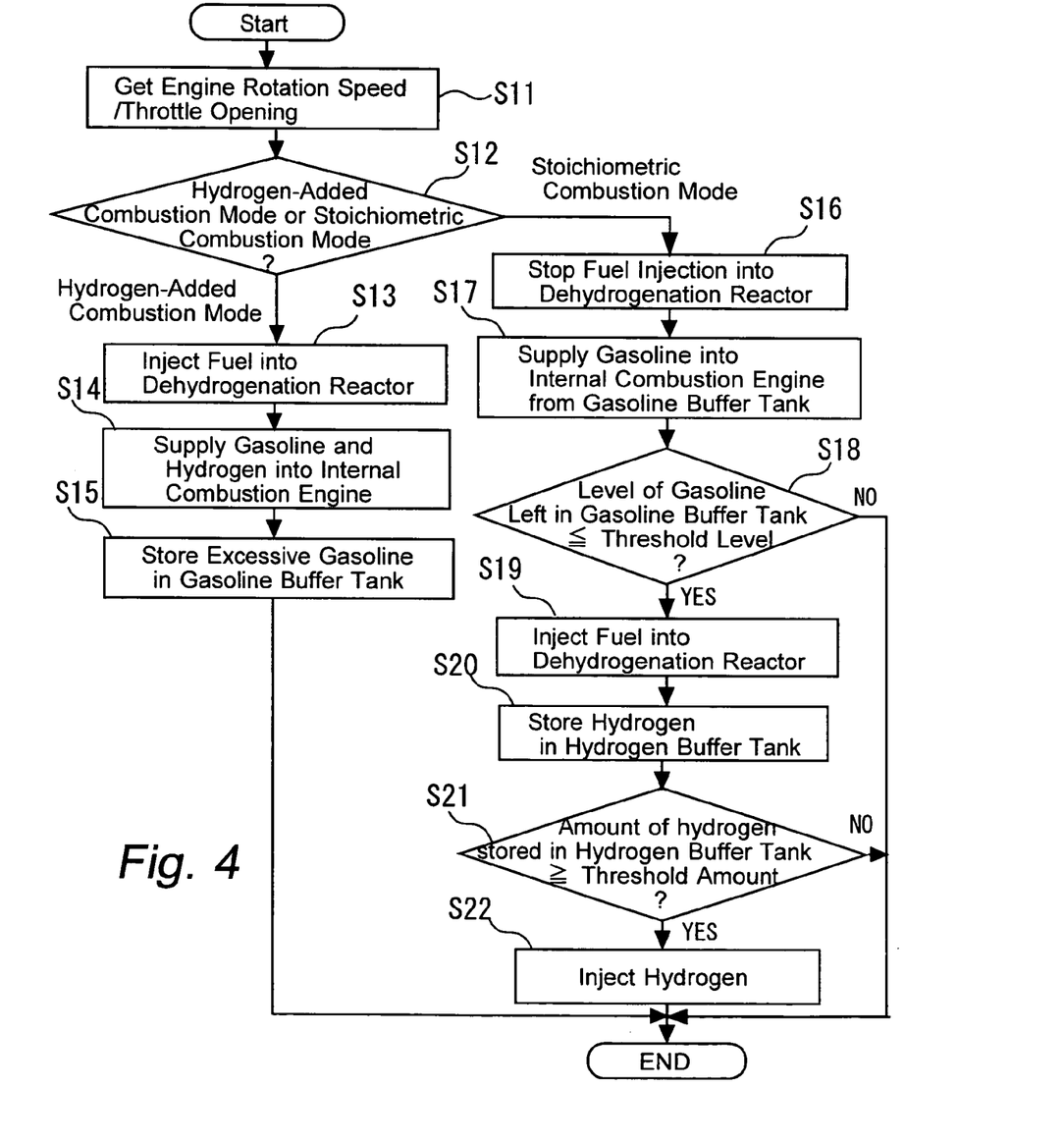
FIG. 4 is a flowchart of processing performed by the hydrogen-used internal combustion engine in the second embodiment.

FIG. 4 is a flowchart of processing performed by the hydrogen-used internal combustion engine in the second embodiment. At first, the engine rotation speed and the throttle opening are obtained in step S11. Then, based on the engine rotation speed and throttle opening obtained in step S11, it is judged in step S12 which of the hydrogen-added combustion mode and the stoichiometric combustion mode is appropriate for the current operating condition.

If the hydrogen-added combustion mode is judged appropriate in step S12, processing goes to step S13. In this case, hydrogen must be generated from hydrogenated gasoline in order to supply hydrogen to the internal combustion engine 10. Therefore, hydrogenated gasoline is injected into the dehydrogenation reactor 22 from the hydrogenated gasoline injector 24. In the dehydrogenation reactor 22, hydrogen and gasoline are generated as a result of dehydrogenation reaction.

In the next step S14, certain amounts of hydrogen and gasoline which depend on the operating conditions are supplied to the internal combustion engine 10 from the hydrogen injector 18 and the gasoline injector 20. The amounts of hydrogen and gasoline to be supplied are calculated according to the engine rotation speed and throttle opening obtained in step S11. Alternatively, the amounts of hydrogen and gasoline to be supplied may also be determined from a map that defines the relationships between the amounts of hydrogen and gasoline to be supplied and the engine rotation speed and the throttle opening. The internal combustion engine 10 is thus operated in the hydrogen-added combustion mode.

In the next step S15, excessive gasoline that was generated by dehydrogenation reaction in step S13 but not supplied to the internal combustion engine 10 is stored in the gasoline buffer tank 48. After step S5, processing is terminated.

If the stoichiometric combustion mode is judged appropriate in step S12, processing goes to step S16. In step S16, injection of hydrogenated gasoline into the dehydrogenation reactor 22 is stopped.

In the next step S17, gasoline stored in the gasoline buffer tank 48 is sent to the gasoline injector 20 for injection into the internal combustion engine 10. The internal combustion engine 10 is thus operated in the stoichiometric combustion mode.

In the next step 18, it is judged whether the level of gasoline left in the gasoline buffer tank 48 is higher than a threshold level. If it is judged in step S18 that the level of gasoline is equal to or lower than the threshold level, processing goes to step S19. If the level of gasoline is higher than the predefined level, processing is terminated. The threshold level used for judgment in step S18 is set so as to prevent gasoline in the gasoline buffer tank 48 from falling short. The threshold level is varied according to the engine rotation speed and the maximum load at that engine rotation speed.

In step S19, since gasoline in the gasoline buffer tank 48 may fall short due to consumption in the stoichiometric combustion mode, hydrogenated gasoline is injected into the dehydrogenation reactor 22 from the hydrogenated gasoline injector 24 in order to generate gasoline and hydrogen through the dehydrogenation process. Generated gasoline is sent to the gasoline buffer tank 48 for use in the stoichiometric combustion mode.

In the next step S20, hydrogen generated by dehydrogenation reaction in step S19 is stored in the hydrogen buffer tank 64. In the stoichiometric combustion mode, since hydrogen is not used for operation as a rule, the hydrogen generated through dehydrogenation process is all stored in the hydrogen buffer tank 64. Hydrogen stored in the hydrogen buffer tank 64 will be used for operation in the hydrogen-added combustion mode.

In the next step S21, it is judged whether the amount of hydrogen stored in the hydrogen buffer tank is smaller than a threshold amount. If the amount of hydrogen is equal to or larger than the threshold amount, processing goes to step S22 where hydrogen is injected into the internal combustion engine 10 from the hydrogen injector 18 in order to prevent the hydrogen buffer tank 64 from being saturated with hydrogen. If the amount of hydrogen is judged smaller than the threshold in step S21, processing is terminated.

In the second embodiment, as described so far, if the level of gasoline left in the gasoline buffer tank 48 falls to or below a certain level while the internal combustion engine 10 operating in the stoichiometric combustion mode, hydrogenated gasoline is injected into the dehydrogenation reactor 22 to generate gasoline. It is therefore possible to prevent gasoline in the gasoline buffer tank 48 from falling short.

In addition, if the amount of hydrogen in the hydrogen buffer tank 64 reaches or exceeds a certain amount when the dehydrogenation reaction is performed during operation in the stoichiometric combustion mode, hydrogen is injected from the hydrogen injector 18. Therefore, it is possible to prevent the hydrogen buffer tank 64 from being saturated with hydrogen.

Third Embodiment

The following describes a third embodiment of the present invention. The third embodiment is identical to the first embodiment in that excessive gasoline in the hydrogen-added combustion mode will be used in the stoichiometric combustion mode. In the third embodiment, however, if the level of gasoline left in the gasoline buffer tank 48 reaches or exceeds a certain level during operation in the hydrogen-added combustion mode, operation is temporally performed in the stoichiometric combustion mode without generating hydrogen through dehydrogenation reaction.

Figure 5:
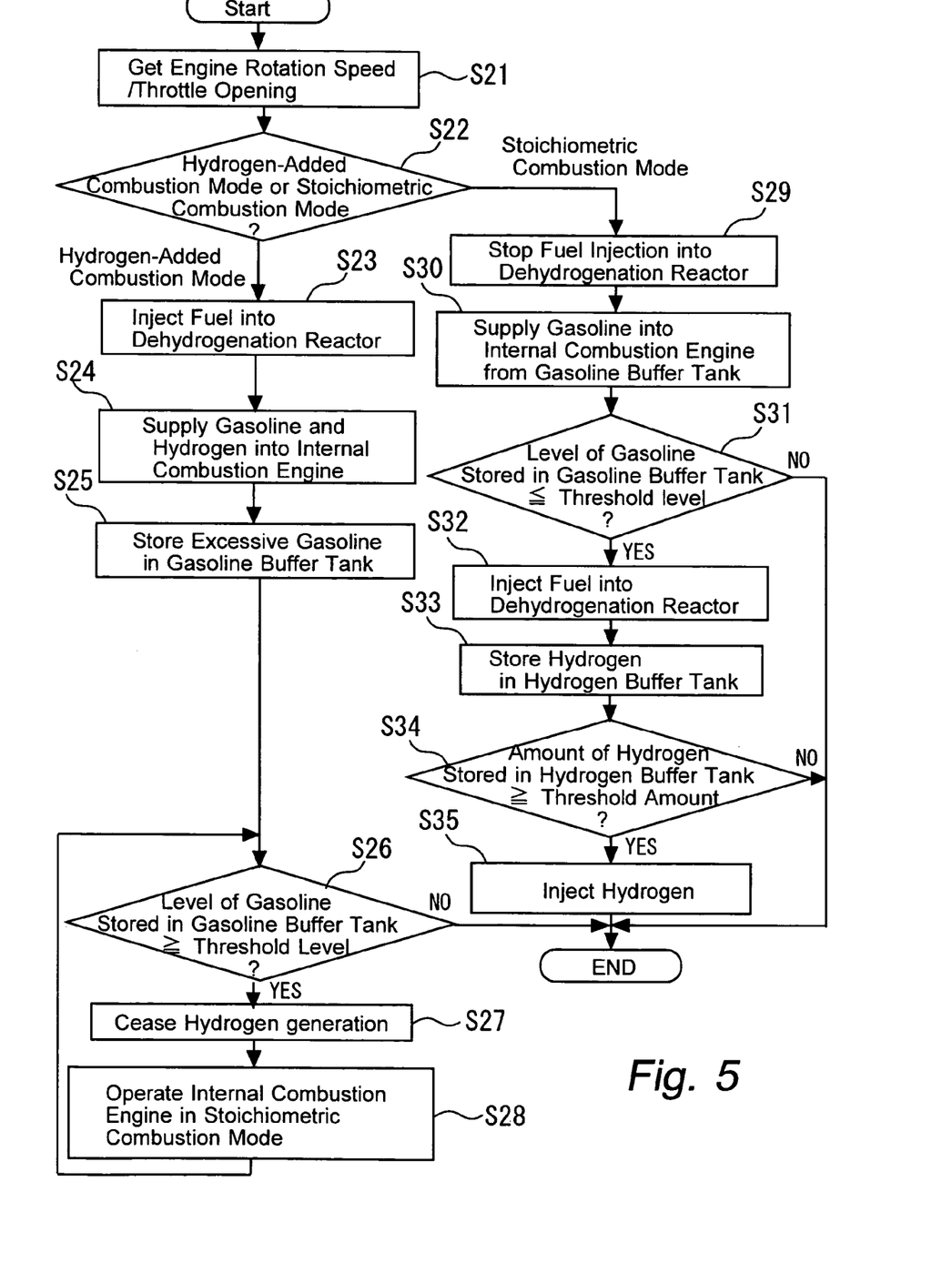
FIG. 5 is a flowchart of processing performed by the hydrogen-used internal combustion engine in the third embodiment.

FIG. 5 is a flowchart of processing performed by the hydrogen-used internal combustion engine in the third embodiment. At first, the engine rotation speed and the throttle opening are obtained in step S21. Then, based on the engine rotation speed and throttle opening obtained in step S21, it is judged in step S22 which of the hydrogen-added combustion mode and the stoichiometric combustion mode is appropriate for the current operating conditions.

If the hydrogen-added combustion mode is judged appropriate in step S22, processing goes to step S23. In this case, hydrogen must be generated from hydrogenated gasoline in order to supply hydrogen to the internal combustion engine 10. Therefore, hydrogenated gasoline is injected into the dehydrogenation reactor 22 from the hydrogenated gasoline injector 24. In the dehydrogenation reactor 22, hydrogen and gasoline are generated as a result of dehydrogenation reaction.

In the next step S24, certain amounts of hydrogen and gasoline that depend on the operating conditions are supplied to the internal combustion engine 10 from the hydrogen injector 18 and the gasoline injector 20. The amounts of hydrogen and gasoline to be supplied are calculated according to the engine rotation speed and throttle opening obtained in step S21. Alternatively, the amounts of hydrogen and gasoline to be supplied may also be determined from a map that defines the relationships between the amounts of hydrogen and gasoline to be supplied and the engine rotation speed and the throttle opening. The internal combustion engine 10 is thus operated in the hydrogen-added combustion mode.

In the next step S25, excessive gasoline that was generated by dehydrogenation reaction in step S23 but not supplied to the internal combustion engine 10 is stored in the gasoline buffer tank 48.

In the next step S26, it is judged whether the level of gasoline stored in the gasoline buffer tank 48 is not lower than a threshold level. If the level of gasoline is judged not lower than the threshold level in step S26, processing goes to step S27. In this case, since a great amount of gasoline is stored in the gasoline buffer tank 48, the gasoline buffer tank 48 is saturated with gasoline if dehydrogenation reaction is continued. Accordingly, hydrogen generation is ceased in step S27 by stopping the hydrogenated gasoline injector 24 injecting fuel.

In the next step S28, the internal combustion engine 10 is operated in the stoichiometric combustion mode. Gasoline stored in the gasoline buffer tank 48 is injected from the gasoline injector 20. Since gasoline in the gasoline buffer tank 48 is consumed, it is possible to prevent the gasoline buffer tank 48 from being saturated. Note that in step S28, operation is temporarily done in the stoichiometric combustion mode to consume gasoline in the gasoline buffer tank 48 although the hydrogen-added combustion mode is judged appropriate for the current operating conditions.

After step S28, processing goes back to step S26 to monitor the level of gasoline left in the gasoline buffer tank 48.

If the stoichiometric combustion mode is judged appropriate in step S22, processing goes to step S29. In step S29, injection of hydrogenated gasoline into the dehydrogenation reactor 22 is stopped.

In the next step S30, gasoline stored in the gasoline buffer tank 48 is sent to the gasoline injector 20 for injection into the internal combustion engine 10. The internal combustion engine 10 is thus operated in the stoichiometric combustion mode.

In the next step S31, it is judged whether the level of gasoline stored in the gasoline buffer tank 48 is higher than a threshold level. If it is judged in step S31 that the level of gasoline is equal to or lower than the threshold level, processing goes to step S32. If the level of gasoline is higher than the predefined level, processing is terminated.

In step S32, since gasoline in the gasoline buffer tank 48 may fall short due to consumption in the stoichiometric combustion mode, hydrogenated gasoline is injected into the dehydrogenation reactor 22 from the hydrogenated gasoline injector 24 in order to generate gasoline and hydrogen through the dehydrogenation process. Generated gasoline is sent to the gasoline buffer tank 48 for use in the stoichiometric combustion mode.

In the next step S33, hydrogen generated by dehydrogenation reaction in step S32 is stored in the hydrogen buffer tank 64. In the stoichiometric combustion mode, since hydrogen is not used for operation as a rule, the hydrogen generated through the dehydrogenation process is all stored in the hydrogen buffer tank 64.

In the next step S34, it is judged whether the amount of hydrogen stored in the hydrogen buffer tank 64 is smaller than a threshold amount. If the amount of hydrogen is equal to or larger than the threshold amount, processing goes to step S35 where hydrogen is injected into the internal combustion engine 10 from the hydrogen injector 18 in order to prevent the hydrogen buffer tank 64 from being saturated with hydrogen. If the amount of hydrogen is judged smaller than the threshold in step S34, processing is terminated.

In the third embodiment, as described so far, if the level of gasoline left in the gasoline buffer tank 48 reaches or exceeds a certain level while the internal combustion engine 10 operating in the hydrogen-added combustion mode, injection of hydrogenated gasoline into the dehydrogenation reactor 22 is stopped. Since further generation of gasoline by dehydrogenation reaction is suppressed, it is possible to prevent the gasoline buffer tank 48 from being saturated with gasoline.

In addition, if the dehydrogenation reaction is stopped in the hydrogen-added combustion mode, the internal combustion engine 10 is temporally operated in the stoichiometric combustion mode. In this case, the internal combustion engine 10 can operate by using gasoline stored in the gasoline buffer tank 48.

Fourth Embodiment

The following describes a fourth embodiment of the present invention. The system of this embodiment is provided with a hydrogen engine mode in which the internal combustion engine 10 runs on hydrogen only.

During idling or low rotation speed operation with a low load, since the amount of gasoline injected from the gasoline injector 20 has relatively larger influence on the fuel efficiency, it is preferable to suppress the amount of gasoline to be injected.

In the fourth embodiment during idling or low rotation speed operation with a low load, the internal combustion engine 10 depends entirely on the hydrogen injected from the hydrogen injector 18 since gasoline injection from the gasoline injector 20 is stopped (hydrogen engine mode). This makes it possible to not only suppress deterioration in fuel efficiency but also improve the discharged emission.

Figure 6:
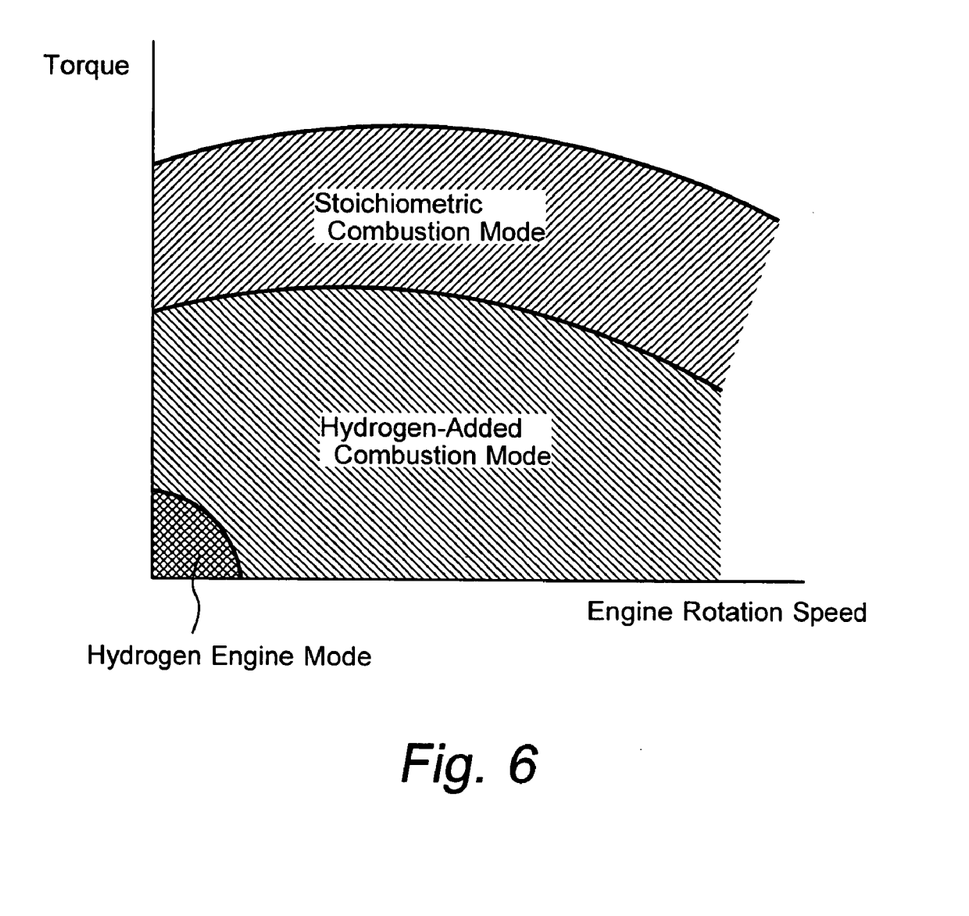
FIG. 6 schematically shows the operation modes of the system of the fourth embodiment.

FIG. 6 schematically shows the operation modes of the system of the embodiment. As shown in FIG. 6, the fourth embodiment is provided with not only the same stoichiometric combustion mode and hydrogen-added combustion mode as in the first embodiment but also a hydrogen engine mode in which the internal combustion engine 10 runs on only hydrogen during idling or low rotation speed operation with a low load.

Figure 7:
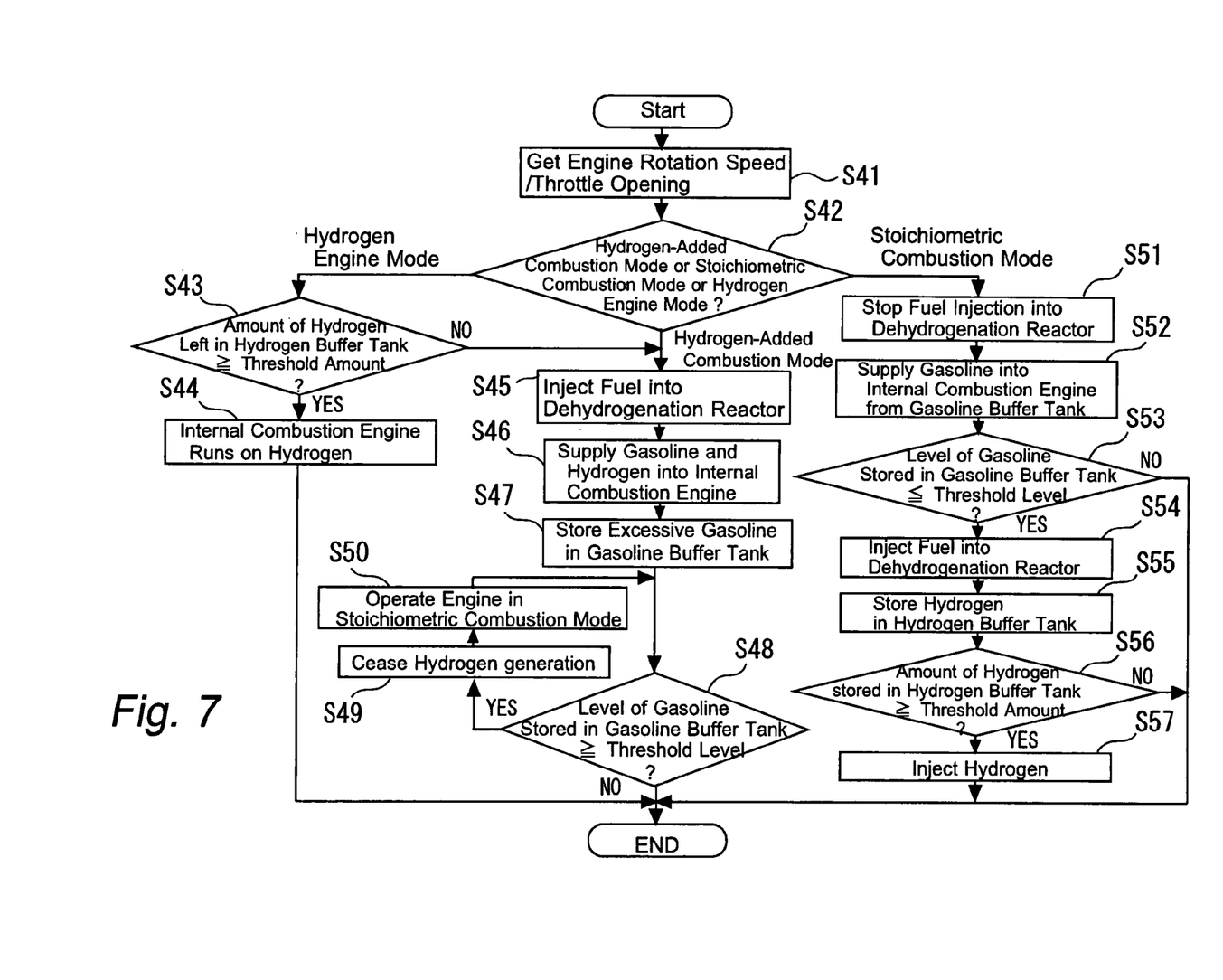
FIG. 7 is a flowchart of processing performed by the hydrogen-used internal combustion engine in the fourth embodiment.

FIG. 7 is a flowchart of processing performed by the hydrogen-used internal combustion engine in the fourth embodiment. At first, the engine rotation speed and the throttle opening are obtained in step S41. Then, based on the engine rotation speed and throttle opening obtained in step S41, it is judged in step S42 which of the hydrogen-added combustion mode, the stoichiometric combustion mode and the hydrogen engine mode is appropriate for the current operating condition.

If the hydrogen engine mode is judged appropriate in step S42, processing goes to S43. In step S43, it is judged whether the amount of hydrogen left in the hydrogen buffer tank 64 is not smaller than a threshold amount. If the amount of hydrogen is judged not smaller than the threshold amount in step S43, processing goes to step S44. On the other hand, if the amount of hydrogen is smaller than the threshold amount, processing goes to step S45 and beyond to perform operation in the hydrogen-added combustion mode.

In step S44, fuel injection from the hydrogenated gasoline injector 24 is stopped to suppress generation of hydrogen. This is because dehydrogenation reaction is difficult to promote since the exhaust temperature is not so high in the hydrogen engine mode.

Also in step S44, gasoline injection from the gasoline injector 20 is stopped. In the hydrogen engine mode, the internal combustion engine 10 runs on hydrogen which is supplied from the hydrogen buffer tank 64 and injected by the hydrogen injector 18.

If the amount of hydrogen left in the hydrogen buffer tank 64 is judged as smaller than the lower limit in S43, processing goes to step S46 which is also performed after the hydrogen-added combustion mode is judged as appropriate in step S42.

If the hydrogen-added combustion mode is judged appropriate in step S42, processing goes to step S45. In this case, hydrogen must be generated from hydrogenated gasoline in order to supply hydrogen to the internal combustion engine 10. Therefore, hydrogenated gasoline is injected into the dehydrogenation reactor 22 from the hydrogenated gasoline injector 24. In the dehydrogenation reactor 22, hydrogen and gasoline are generated as a result of dehydrogenation reaction.

In the next step S46, certain amounts of hydrogen and gasoline which depend on the operating conditions are supplied to the internal combustion engine 10 from the hydrogen injector 18 and the gasoline injector 20. The amounts of hydrogen and gasoline to be supplied are calculated according to the engine rotation speed and throttle opening obtained in step S41. Alternatively, the amounts of hydrogen and gasoline to be supplied may also be determined from a map that defines the relationships between the amounts of hydrogen and gasoline to be supplied and the engine rotation speed and the throttle opening. The internal combustion engine 10 is thus operated in the hydrogen-added combustion mode.

In the next step S47, excessive gasoline that was generated by dehydrogenation reaction in step S45 but not supplied to the internal combustion engine 10 is stored in the gasoline buffer tank 48.

In the next step S48, it is judged whether the level of gasoline stored in the gasoline buffer tank 48 is not lower than a threshold level. If the level of gasoline is judged not lower than the threshold level in step S48, processing goes to step S49. In this case, since a great amount of gasoline is stored in the gasoline buffer tank 48, the gasoline buffer tank 48 is saturated with gasoline if dehydrogenation reaction is continued. Accordingly, hydrogen generation is suppressed in step S49 by stopping the hydrogenated gasoline injector 24 injecting fuel.

In the next step S50, the internal combustion engine 10 is operated in the stoichiometric combustion mode. Gasoline stored in the gasoline buffer tank 48 is injected from the gasoline injector 20. Since gasoline in the gasoline buffer tank 48 is consumed, it is possible to prevent the gasoline buffer tank 48 from being saturated. Note that in step S50, operation is temporarily done in the stoichiometric combustion mode to consume gasoline in the gasoline buffer tank 48 although the hydrogen-added combustion mode is judged appropriate for the current operating conditions.

After step S50, processing goes back to step S48 to monitor the level of gasoline left in the gasoline buffer tank 48.

If the stoichiometric combustion mode is judged appropriate in step S42, processing goes to step S51. In step S51, injection of hydrogenated gasoline into the dehydrogenation reactor 22 is stopped.

In the next step S52, gasoline stored in the gasoline buffer tank 48 is sent to the gasoline injector 20 for injection into the internal combustion engine 10. The internal combustion engine 10 is thus operated in the stoichiometric combustion mode.

In the next step S53, it is judged whether the level of gasoline stored in the gasoline buffer tank 48 is higher than a threshold level. If it is judged in step S53 that the level of gasoline is equal to or lower than the threshold level, processing goes to step S54. If the level of gasoline is higher than the predefined level, processing is terminated.

In step S54, since gasoline in the gasoline buffer tank 48 may fall short due to consumption in the stoichiometric combustion mode, hydrogenated gasoline is injected into the dehydrogenation reactor 22 from the hydrogenated gasoline injector 24 in order to generate gasoline and hydrogen by dehydrogenation reaction. Generated gasoline is sent to the gasoline buffer tank 48 for use in the stoichiometric combustion mode.

In the next step S55, hydrogen generated by dehydrogenation reaction in step S54 is stored in the hydrogen buffer tank 64. In the stoichiometric combustion mode, since hydrogen is not used for operation as a rule, the hydrogen generated through dehydrogenation process is all stored in the hydrogen buffer tank 64.

In the next step S56, it is judged whether the amount of hydrogen stored in the hydrogen buffer tank 64 is smaller than a threshold amount. If the amount of hydrogen is equal to or larger than the threshold amount, processing goes to step S57 where hydrogen is injected into the internal combustion engine 10 from the hydrogen injector 18 in order to prevent the hydrogen buffer tank 64 from being saturated with hydrogen. If the amount of hydrogen is judged smaller than the threshold in step S56, processing is terminated.

As described so far, in the fourth embodiment during idling or low rotation speed operation with a low load, the gasoline injector 20 stops injecting gasoline so that the internal combustion engine 10 runs on the hydrogen injected from the hydrogen injector 18. This makes it possible to improve the fuel efficiency and discharged mission.

In each of the embodiments described so far, the present invention is applied to a single-fuel system where only hydrogenated gasoline is supplied as fuel and separated into hydrogen and gasoline for injection into the internal combustion engine 10. Needles to say, the present invention may also be applied to such a dual-fuel system where methylcyclohexane and normal gasoline are supplied as two types of fuels and hydrogen separated from methylcyclohexane and normal gasoline are injected into the internal combustion engine 10.

The major benefits of the present invention described above are summarized as follows:

If organic hydride-contained fuel is separated into hydrogen and dehydrogenated fuel for supply to the internal combustion engine, excessive dehydrogenated fuel occurs since dehydrogenated fuel is generated more than consumed. According to a first aspect of the present invention, operation of the internal combustion engine is switched between in a first mode in which both hydrogen and dehydrogenated fuel are supplied to the internal combustion engine and a second mode in which only dehydrogenated fuel is supplied to the internal combustion engine. Therefore, the excessive dehydrogenated fuel can be consumed in the second mode, which makes it possible to prevent the excessive dehydrogenated fuel from pooling in the system. In addition, if hydrogen is used preferentially in the first mode, lean burn combustion is possible. Thus, it is possible to improve the fuel expenses and engine efficiency and emission.

According to a second aspect of the present invention, separated dehydrogenated fuel is stored in first storage means in the first mode and dehydrogenated fuel stored in the first storage means is supplied to the internal combustion engine in the second mode. Thus, excessive dehydrogenated fuel can be consumed in the second mode.

According to a third aspect of the present invention, dehydrogenated fuel is generated by performing the dehydrogenation reaction in the third mode if the amount of dehydrogenated fuel stored in the first storage means falls to or below a predetermined level. This prevents the amount of dehydrogenated fuel stored in the first storage means from becoming too low. In addition, since hydrogen separated by the dehydrogenation reaction in the second mode is stored in second storage means, the stored hydrogen can be supplied to the internal combustion engine when the operation is switched to the first mode.

According to a fourth aspect of the present invention, if the amount of hydrogen stored in the second storage means reaches or exceeds a predetermined level in the second mode, hydrogen stored in the second storage means is supplied to the internal combustion engine. This prevents the first storage means from being saturated with hydrogen.

According to a fifth aspect of the present invention, if the amount of dehydrogenated fuel stored in the first storage means reaches or exceeds a predetermined level in the first mode, the dehydrogenation reaction is stopped and dehydrogenated fuel stored in the first storage means is supplied to the internal combustion engine. This prevents the first storage means from being saturated with dehydrogenated fuel.

According to a sixth aspect of the present invention, the first mode is a stoichiometric combustion mode and the second mode is a lean burn combustion mode. High load and high rotation speed operation is possible in the stoichiometric combustion mode. The lean burn combustion mode can not only improve the fuel expenses and engine efficiency but also suppress NOx emission.

According to a seventh aspect of the present invention, operation of the internal combustion engine is switched among first through third modes based on the operating condition of the internal combustion engine and the amount of the dehydrogenated fuel stored in the first storage means or the amount of hydrogen stored in the second storage means. It is therefore possible to perform optimum operation according to the operating condition while keeping appropriate the amounts of dehydrogenated fuel and hydrogen stored in the first and second storage means.

According to an eighth aspect of the present invention, separated dehydrogenated fuel is stored in the first storage means in the second mode and dehydrogenated fuel stored in the first storage means is supplied to the internal combustion engine in the third mode. Therefore, excessive dehydrogenated fuel can be consumed in the third mode.

According to a ninth aspect of the present invention, dehydrogenated fuel is generated by performing the dehydrogenation reaction in the third mode if the amount of dehydrogenated fuel stored in the first storage means falls to or below a predetermined level. This prevents the amount of dehydrogenated fuel stored in the first storage means from becoming too low. In addition, since hydrogen separated by the dehydrogenation reaction in the third mode is stored in the second storage means, stored hydrogen can be supplied to the internal combustion engine when the operation is switched to the second mode.

According to a tenth aspect of the present invention, if the amount of hydrogen stored in the second storage means reaches or exceeds a predetermined level in the third mode, hydrogen stored in the second storage means is supplied to the internal combustion engine. This prevents the second storage means from being saturated with hydrogen.

According to an eleventh aspect of the present invention, if the amount of dehydrogenated fuel stored in the first storage means reaches or exceeds a predetermined level in the second mode, the dehydrogenation reaction is stopped and dehydrogenated fuel stored in the first storage means is supplied to the internal combustion engine. This prevents the first storage means from being saturated with dehydrogenated fuel.

Further, the present invention is not limited to these embodiments, but variations and modifications may be made without departing from the scope of the present invention.

The entire disclosure of a Japanese Patent Application No. 2004-116608, filed on Apr. 12, 2004 including specification, claims, drawings and summary, on which the Convention priority of the present application is based, are incorporated herein by reference in its entirety.

The invention claimed is:

1. A hydrogen-used internal combustion engine comprising:
   dehydrogenating means for performing a dehydrogenation reaction to separate an organic hydride-contained fuel into hydrogen and a dehydrogenated fuel;
   supplying means for supplying the separated hydrogen and dehydrogenated fuel individually to the internal combustion engine; and
   control means for switching the operation of the internal combustion engine between a first mode in which both hydrogen and dehydrogenated fuel are supplied to the internal combustion engine and a second mode in which only the dehydrogenated fuel is supplied to the internal combustion engine,
   wherein the first mode is a stoichiometric combustion mode and the second mode is a lean burn combustion mode.

2. A hydrogen-used internal combustion engine according to claim 1, wherein:
   the dehydrogenating means performs the dehydrogenation reaction in the first mode;
   first storage means is provided which stores the dehydrogenated fuel separated in the first mode; and
   in the second mode, the dehydrogenated fuel stored in the first storage means is supplied to the internal combustion engine.

3. A hydrogen-used internal combustion engine according to claim 2, wherein:
   the dehydrogenating means performs the dehydrogenation reaction in the second mode if an amount of the dehydrogenated fuel stored in the first storage means falls to or below a predetermined level; and
   second storage means is provided which stores hydrogen separated by the dehydrogenation reaction in the second mode.

4. A hydrogen-used internal combustion engine according to claim 3, wherein if an amount of hydrogen stored in the second storage means reaches or exceeds a predetermined level in the second mode, hydrogen stored in the second storage means is supplied to the internal combustion engine.

5. A hydrogen-used internal combustion engine according to claim 2, wherein if the amount of the dehydrogenated fuel stored in the first storage means reaches or exceeds a predetermined level in the first mode, the dehydrogenation reaction is stopped and the dehydrogenated fuel stored in the first storage means is supplied to the internal combustion engine.

6. A hydrogen-used internal combustion engine comprising:
   dehydrogenating means for performing a dehydrogenation reaction to separate an organic hydride-contained fuel into hydrogen and a dehydrogenated fuel;
   supplying means for supplying the separated hydrogen and dehydrogenated fuel individually to the internal combustion engine; and
   control means for switching the operation of the internal combustion engine among a first mode in which only hydrogen is supplied to the internal combustion engine, a second mode in which both hydrogen and dehydrogenated fuel is supplied to the internal combustion engine and a third mode in which only the dehydrogenated fuel is supplied to the internal combustion engine;
   first storage means for storing the separated dehydrogenated fuel; and
   second storage means for storing the separated hydrogen;
   wherein the control means switches the operation mode of the internal combustion engine among first through third modes based on an operating condition of the internal combustion engine and an amount of the dehydrogenated fuel stored in the first storage means or an amount of hydrogen stored in the second storage means.

7. A hydrogen-used internal combustion engine according to claim 6, wherein:
   the dehydrogenating means performs the dehydrogenation reaction in the second mode;
   the first storage means stores the dehydrogenated fuel separated by the dehydrogenation reaction in the second mode;
   in the third mode, the dehydrogenated fuel stored in the first storage means is supplied to the internal combustion engine.

8. A hydrogen-used internal combustion engine according to claim 7, wherein:
   the dehydrogenating means performs the dehydrogenation reaction in the third mode if the amount of the dehydrogenated fuel stored in the first storage means falls to or below a predetermined level; and
   the second storage means stores the hydrogen separated by the dehydrogenation reaction in the third mode.

9. A hydrogen-used internal combustion engine according to claim 8, wherein if an amount of hydrogen stored in the second storage means reaches or exceeds a predetermined level, hydrogen stored in the second storage means is supplied to the internal combustion engine.

10. A hydrogen-used internal combustion engine according to claim 7, wherein if the amount of the dehydrogenated fuel stored in the second storage means reaches or exceeds a predetermined level, the dehydrogenation reaction is stopped and the dehydrogenated fuel stored in the second storage means is supplied to the internal combustion engine.

* * * * *